Patented Oct. 20, 1942

2,299,169

UNITED STATES PATENT OFFICE 2,299,169

PROCESS OF MAKING EXTENDED PIGMENT WITH IMPROVED TINTING STRENGTH

Kenneth S. Mowlds, Baltimore, Md., assignor to The Glidden Company, Cleveland, Ohio, a corporation of Ohio No Drawing. Application August 2, 1940, Serial No. 350,057

2 Claims. (Cl. 106—294)

The present invention relates to the production of pigments and has particular reference to the manufacture of extended pigments employing barium sulfate as an extender.

Among the objects of this invention is the provision of a process for making composite pigment of high, improved tinting strength.

More specifically, it is an object of this invention to provide a process for producing lithopone and other extended pigments of high, improved tinting strength in a highly efficient and simple manner.

Other, further and more specific objects of this invention will become readily apparent to persons skilled in the art from a consideration of the following description:

The use of barium sulfate as an extender for pigments is well known. In lithopone, zinc sulfide is extended with barium sulfate. Barium sulfate as an extender for titanium dioxide is also well known.

According to the present invention, there is provided a process for producing barium sulfate which, when used as an extender for such pigments as zinc sulfide, zinc oxide, cadmium sulfide, cadmium reds, white lead and titanium oxide, results in an extended pigment of improved tinting strength.

I have found that the desired objects of the present invention may be obtained by precipitating the barium sulfate from a barium sulfide solution by means of a sulfate of a metal of the alkali metal group, such as potassium sulfate, sodium sulfate and lithium sulfate.

Also, in the manufacture of lithopone, if the precipitation is carried out in the presence of an excess of potassium sulfate, preferably in such a manner that the barium sulfate is precipitated by the potassium sulfate and the zinc sulfide by the liberated potassium sulfide, a lithopone of improved tinting strength is produced.

The reactions involved may be represented as follows:

(1) $BaS + K_2SO_4 \rightarrow K_2S + BaSO_4$
and
(2) $K_2S + ZnSO_4 \rightarrow ZnS + K_2SO_4$ By conducting the strike under conditions which minimize the direct reaction of the barium and zinc liquors and which facilitate the precipitation of the barium sulfate with $K_2SO_4$ and the precipitation of the zinc sulfide with $K_2S$ the desired results are obtained.

One manner in which these conditions may be obtained is to add the barium and zinc liquors to the strike tank at as widely separated points as possible and to employ a mild agitation sufficient to transfer the $K_2S$ liberated by Equation 1 to the point of introduction of the zinc liquor and to transfer the $K_2SO_4$ liberated by Equation 2 to the point of introduction of the barium liquor, without sufficient agitation, however, to bring about substantial precipitation by direct reaction of the barium sulfide and zinc sulfate. Other modes of effecting precipitation of the $BaSO_4$ and $ZnS$ by the $K_2SO_4$ and $K_2S$ present, while minimizing direct reaction between the barium and zinc liquors, may also be employed.

The $K_2SO_4$ may be added to either the barium liquor, the zinc liquor, or to water added with the zinc and barium liquors in the strike tank. The progress of the reactions taking place when the $K_2SO_4$ is added to the barium liquor is as follows: The strike is preferably started in a tank containing some water and the two solutions introduced at widely separated points. Upon addition of the $K_2SO_4$ to the barium liquor some $BaSO_4$ is precipitated with the formation of $K_2S$, so that the barium liquor in the strike tank contains $BaS$, $K_2S$ and $BaSO_4$. Mild agitation is employed and, when the $K_2S$ is transferred to the point of introduction of the zinc liquor, zinc sulfide is precipitated and $K_2SO_4$ formed. Of course, some co-precipitation of barium sulfate and zinc sulfide will take place when the strike is first started, but this can be minimized by the presence of some $K_2SO_4$ and/or $K_2S$ in the water used to start the strike. However, as the strike proceeds an excess of $K_2SO_4$ is formed and the direct reaction between barium and zinc liquors substantially or completely prevented. The $K_2SO_4$ liberated by the reaction at the point of introduction of the zinc liquor is transferred back to the point at which the barium liquor is introduced, resulting in the precipitation of $BaSO_4$ and the reformation of $K_2S$.

Soon after the strike is started the concentration of $K_2SO_4$ and $K_2S$ in the solution is such that the separate precipitation of the $BaSO_4$ and $ZnS$ can be effected without any direct reaction between the barium and zinc liquors.

Examples of carrying out this invention are as follows:

Example I

To a barium sulfide liquor containing 225 grams BaS per liter is added twice the volume of $K_2SO_4$ solution containing 115 grams of $K_2SO_4$ per liter. The precipitate of $BaSO_4$ is filtered off, washed and then mixed with calcined titanium oxide in the proportions of 30 parts $TiO_2$ and 70 parts $BaSO_4$. The mixture is then heated to approximately 700° C.

The extended pigment, thus produced, has a tinting strength of 180, as compared to a tinting strength of 145–150 for commercial $TiO_2$—$BaSO_4$ pigment (having the same 30 to 70 ratio).

*Example II*

To a barium sulfide liquor containing 225 grams BaS per liter is added twice the volume of $K_2SO_4$ solution containing 115 grams $K_2SO_4$ per liter. The precipitate of $BaSO_4$ is filtered off and then washed thoroughly. It is then calcined at approximately 700° C., and then mixed with calcined $TiO_2$ in the proportions of 30 parts $TiO_2$ and 70 parts $BaSO_4$.

*Example III*

To a barium sulfide liquor containing 225 grams BaS per liter is added twice the volume of $K_2SO_4$ solution containing 115 grams $K_2SO_4$ per liter. The precipitate of $BaSO_4$ is filtered off and then washed thoroughly. It is then mixed with calcined $TiO_2$ in the proportions of 30 parts $TiO_2$ and 70 parts $BaSO_4$ and the mixture dried without calcining.

*Example IV*

To a barium sulfide liquor containing 225 grams BaS per liter is added twice the volume of $Na_2SO_4$ solution containing 115 grams of $Na_2SO_4$ per liter. The precipitate of $BaSO_4$ is filtered off, washed and then mixed with calcined titanium oxide in the proportions of 30 parts $TiO_2$ and 70 parts $BaSO_4$. The mixture is then heated to approximately 700° C.

*Example V*

To a barium sulfide liquor containing 225 grams BaS per liter is added twice the volume of $K_2SO_4$ solution containing 115 grams $K_2SO_4$ per liter. The precipitate of $BaSO_4$ is filtered off and then washed thoroughly. It is then calcined at approximately 700° C., and then mixed with calcined ZnO in the proportions of 50 parts ZnO and 50 parts $BaSO_4$.

*Example VI*

To a barium sulfide liquor containing 225 grams BaS per liter is added twice the volume of $K_2SO_4$ solution containing 115 grams $K_2SO_4$ per liter. The precipitate of $BaSO_4$ is filtered off and then washed thoroughly. It is then calcined at approximately 700° C., and then mixed with calcined ZnS in the proportions of 50 parts ZnS and 50 parts $BaSO_4$.

*Example VII*

To a barium sulfide liquor containing 225 grams BaS per liter is added twice the volume of $K_2SO_4$ solution containing 115 grams $K_2SO_4$ per liter. The precipitate of $BaSO_4$ is filtered off and then washed thoroughly. It is then calcined at approximately 700° C., and then mixed with calcined CdS in the proportions of 30 parts CdS and 70 parts $BaSO_4$.

*Example VIII*

To a barium sulfide liquor containing 225 grams BaS per liter is added twice the volume of $K_2SO_4$ solution containing 115 grams $K_2SO_4$ per liter. The precipitate of $BaSO_4$ is filtered off and then washed thoroughly. It is then calcined at approximately 700° C., and then mixed with calcined CdS and calcined ZnS in the proportions of 25 parts CdS, 5 parts ZnS and 70 parts $BaSO_4$.

*Example IX*

To a barium sulfide liquor containing 225 grams BaS per liter is added twice the volume of $K_2SO_4$ solution containing 115 grams $K_2SO_4$ per liter. The precipitate of $BaSO_4$ is filtered off and then washed thoroughly. It is then calcined at approximately 700° C., and then mixed with calcined $CdS.Se_x$ in the proportions of 25 parts $CdS.Se_x$ and 75 parts $BaSO_4$.

In the foregoing examples, the extender $BaSO_4$ and the pigment may be mixed either dry or in a slurry and then dried.

The sulfide and the selenide pigments may be either calcined or uncalcined before mixing with the extender $BaSO_4$.

The calcined and uncalcined pigments may be mixed with either calcined or uncalcined extender $BaSO_4$.

The ZnO may be calcined or precipitated. The latter may be mixed with either calcined or uncalcined $BaSO_4$ extender.

*Example X*

To a barium sulfide liquor containing 225 grams BaS per liter is added twice the volume of $K_2SO_4$ solution containing 115 grams $K_2SO_4$ per liter. The precipitate of $BaSO_4$ is filtered off and then washed thoroughly. It is then calcined at approximately 700° C. It is then mixed with white lead in the proportions of 75 parts white lead and 25 parts $BaSO_4$ and the mixture dried without calcining.

If desired, the $BaSO_4$ formed in Example X can be used in uncalcined condition for mixing with the white lead.

*Example XI*

To a liquor containing 225 grams BaS per liter are added 20 grams of $K_2SO_4$ per liter. The resulting liquor containing BaS, $K_2S$ and some $BaSO_4$ is run into a strike tank, preferably at the top on one side, and zinc sulfate liquor containing 175 grams $ZnSO_4$ per liter is run in preferably at the bottom on the other side of the strike tank, the relative rates of introduction of these liquors into the strike tank being regulated to produce a normal lithopone. Water is added to maintain the strike at approximately 9° Baumé, the strike being made at about 75° C. Mild agitation is employed so that as the strike proceeds the $K_2SO_4$ and $K_2S$ are transferred to the points at which the respective liquors are added, but the agitation is insufficient to transfer zinc or barium liquors to cause direct substantial co-precipitation of the barium and zinc liquors. After the strike is complete, the lithopone is filtered, washed to remove soluble salts, ground and calcined in a manner conventional in the art. The calcined lithopone has a tinting strength of 125–150, as compared to a tinting strength of 100–103 for normal lithopone prepared by the prior art method of direct co-precipitation of the barium and zinc liquors. Prior to calcination the tinting strength of the lithopone is somewhat lower than that of the prior art uncalcined lithopone.

It is believed that the $BaSO_4$ prepared according to the present invention results in a better extending of the pigment. However, the invention is not restricted by any theory advanced.

In the manufacture of lithopone according to the method described the amount of the improvement in tinting strength is dependent somewhat upon the degree to which direct co-precipitation of the barium and zinc liquors is retarded or prevented. For some purposes it is not however, necessary to absolutely prevent direct co-precipitation as considerably improved results can be obtained even when there is an appreciable amount of direct reaction between the two liquors. However, best results are obtained if direct reaction is substantially retarded or prevented. Lithopone having a tinting strength of at least 20–30% in excess of the tinting strength of the corresponding extended pigment produced by direct reaction between barium sulfide and zinc sulfate, that is, with a tinting strength of 125–150 on the basis above referred to is readily obtainable, and tints as high as 150 to 155 or higher have been obtained. For best results it is preferred to add the liquors to the strike tank at as widely separated points as possible, and to employ only mild agitation. Under such conditions with an excess of $K_2SO_4$ present, there will be substantially no direct co-precipitation and the optimum results of the present invention will be obtained.

*Example XII*

To a liquor containing 225 grams BaS per liter are added 15 grams of $Li_2SO_4$ per liter. The resulting liquor containing BaS, $Li_2S$ and some $BaSO_4$ is run into a strike tank, preferably at the top on one side, and zinc sulfate liquor containing 175 grams $ZnSO_4$ per liter is run in preferably at the bottom on the other side of the strike tank, the relative rates of introduction of these liquors into the strike tank being regulated to produce a normal lithopone. Water is added to maintain the strike at approximately 9° Baumé, the strike being made at about 75° C. Mild agitation is employed so that as the strike proceeds the $Li_2SO_4$ and $Li_2S$ are transferred to the points at which the respective liquors are added, but the agitation is insufficient to transfer zinc or barium liquors to cause direct substantial co-precipitation of the barium and zinc liquors. After the strike is complete, the lithopone is filtered, washed to remove soluble salts, ground and calcined in a manner conventional in the art.

*Example XIII*

Barium sulfide liquor containing 225 grams BaS per liter is struck simultaneously with the $CdSO_4$ liquor containing 220 grams $CdSO_4$ per liter and a solution of $K_2SO_4$ is also simultaneously added in a sufficient quantity and at sufficient rate to maintain 10 grams per liter $K_2SO_4$ in the resulting strike liquor from the beginning to the end of the run, during which time the volume of strike liquor is increased. The BaS liquor and the $CdSO_4$ liquor are fed into the strike tank at relative rates to produce a normal cadmium lithopone. The $CdSO_4$ solution is preferably fed into the bottom of the strike tank on one side and the barium liquor preferably at the top on the opposite side. The $K_2SO_4$ liquor is preferably fed in at the top. Water is added to maintain the strike at approximately 9° Baumé, the strike being made at 75° C. Mild agitation is employed so that as the strike proceeds the $K_2SO_4$ and $K_2S$ are transferred to the points at which the respective liquors are added, but the agitation is insufficient to transfer the cadmium or barium liquors to cause direct substantial co-precipitation of the barium and cadmium liquors. After the strike is complete, the lithopone is filtered, washed to remove soluble salts, ground and calcined in a manner conventional in the art.

*Example XIV*

To a liquor containing 225 grams BaS per liter are added 20 grams of $K_2SO_4$ per liter. The resulting liquor containing BaS, $K_2S$ and some $BaSO_4$ is run into a strike tank, preferably at the top on one side, and another liquor containing 175 grams $CdSO_4$ per liter and 35 grams $ZnSO_4$ per liter is run in preferably at the bottom on the other side of the strike tank, the relative rates of introduction of these liquors into the strike tank being regulated to produce the desired light tint and cadmium-zinc content lithopone. Water is added to maintain the strike at approximately 9° Baumé, the strike being made at about 75° C. Mild agitation is employed so that as the strike proceeds the $K_2SO_4$ and $K_2S$ are transferred to the points at which the respective liquors are added, but the agitation is insufficient to transfer the cadmium-zinc or barium liquors to cause direct substantial co-precipitation of the barium and cadmium-zinc liquors. After the strike is complete, the lithopone is filtered, washed to remove soluble salts, ground and calcined in a manner conventional in the art.

*Example XV*

To a liquor containing 225 grams BaS per liter and 35 grams selenium per liter are added 20 grams of $K_2SO_4$ per liter. The resulting liquor containing $BaS.Se_x$, $K_2S.Se_x$ and some $BaSO_4$ is run into a strike tank, preferably at the top on one side, and $CdSO_4$ liquor containing 220 grams $CdSO_4$ per liter is run in preferably at the bottom on the other side of the strike tank, the relative rates of introduction of these liquors into the strike tank being regulated to produce the desired red tint and cadmium,selenium content lithopone. Water is added to maintain the strike at approximately 9° Baumé, the strike being made at about 75° C. Mild agitation is employed so that as the strike proceeds the $K_2SO_4$ and $K_2S.Se_x$ are transferred to the points at which the respective liquors are added, but the agitation is insufficient to transfer the cadmium or barium liquors to cause direct substantial co-precipitation of the barium and cadmium liquors. After the strike is complete, the lithopone is filtered, washed to remove soluble salts, ground and calcined in a manner conventional in the art.

In the foregoing examples, the concentration of the salts employed in the reactions are typical for operating conditions suitable for the respective processes. However, it is to be understood that solutions having different concentrations of these salts may also be employed within the scope of this invention. For example, the concentration of $K_2SO_4$ or other alkali metal sulfate employed in the strike tank may vary from 2–40 grams per liter. The $K_2S$ may also be varied from 2–40 grams per liter.

This invention may be employed for the production of normal types of lithopone wherein the ZnS, CdS and/or $CdS.Se_x$ content is substantially equal to the stoichiometric equivalent of the $BaSO_4$ thereof, as well as of lithopones wherein the ZnS, CdS and/or $CdS.Se_x$ content is either lower or higher than the stoichiometric equivalent of the $BaSO_4$ thereof. The improvement in tinting strength and covering power of the lithopones produced by this invention varies with the differences in the chemical compositions of these pigments but, irrespective of the differences in composition of the lithopones, I have found that the lithopones prepared according to the present invention show decided increase and improvement in tinting strength over lithopones of corresponding chemical composition prepared by the methods heretofore employed.

While certain theories and explanations have been advanced they are intended by way of explanation and not of restriction since various changes and modifications may be made by those skilled in the art without departing from the spirit of the invention. Other modes of minimizing the direct co-precipitation of the zinc and barium liquors and of facilitating the precipitation of BaS liquor with $K_2SO_4$ and the $ZnSO_4$ liquor with the $K_2S$ may be employed.

In the foregoing specification and the following claims wherever liquors or solutions of BaS and $K_2S$ are mentioned, it is to be understood that these references apply to the products resulting from the solution of these sulfides in water. It is believed that when BaS is dissolved in water the product of solution consists of $Ba(OH)_2$ and $Ba(SH)_2$. It is also assumed that when $K_2S$ is dissolved in water the product of solution is KOH and KSH. In like manner, reference to liquors or solutions of $Na_2S$ and $Li_2S$ are intended to apply to the products resulting from the solution of these sulfides in water, and reference to liquors or solutions of $BaS.Se_x$ and $K_2S.Se_x$ are intended to apply to the products resulting from the solution of these sulfo-selenides in water.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. The process of producing an extended pigment of improved tinting strength comprising forming a precipitate of $BaSO_4$ and ZnS, the precipitation of the $BaSO_4$ and ZnS being effected respectively by the simultaneous reaction of BaS with the sulfate of an alkali metal and of $ZnSO_4$ with the sulfide of an alkali metal, said sulfate of alkali metal and sulfide of alkali metal existing in the same aqueous bath and being continuously regenerated simultaneously in the process and said precipitation being effected without substantial direct reaction between the barium and zinc liquors by introducing the BaS and $ZnSO_4$ at places in the aqueous bath remote from each other.

2. The process of producing an extended pigment of improved tinting strength comprising forming a precipitate of $BaSO_4$ and ZnS, the precipitation of the $BaSO_4$ and ZnS being effected respectively by the simultaneous reaction of BaS with $K_2SO_4$ and of $ZnSO_4$ with $K_2S$, said $K_2SO_4$ and $K_2S$ existing in the same aqueous bath and continuously regenerated simultaneously in the process and said precipitation being effected without substantial direct reaction between the barium and zinc liquors by introducing the BaS and $ZnSO_4$ at places in the aqueous bath remote from each other.

KENNETH S. MOWLDS.